June 27, 1950 — A. L. JACKSON — 2,513,025
MEAT TENDERIZER
Filed June 8, 1945 — 3 Sheets-Sheet 1

INVENTOR.
ALDRICH L. JACKSON.
BY: *Howard S. Fischer*
ATTORNEY

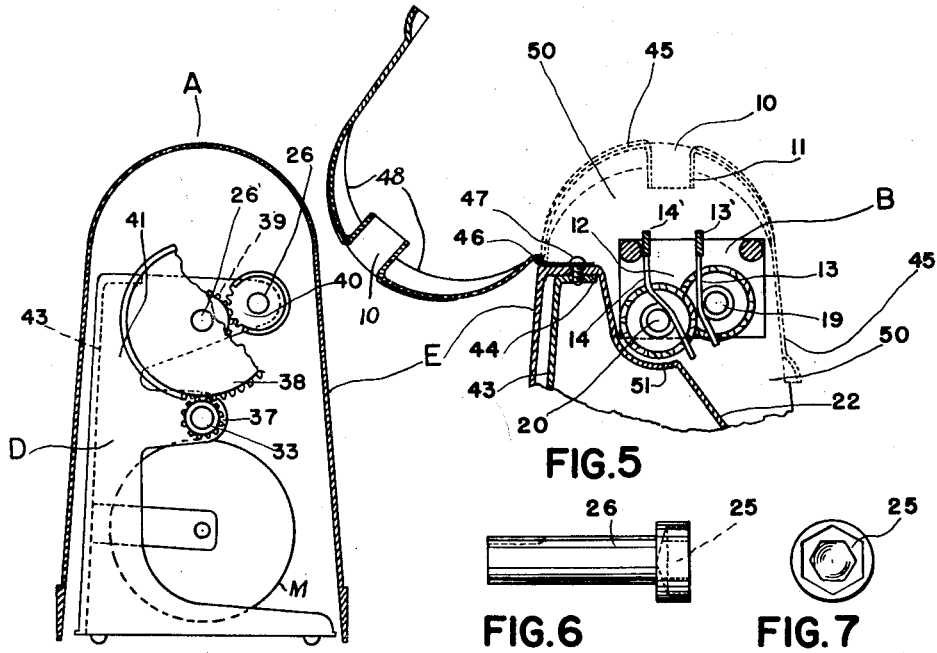
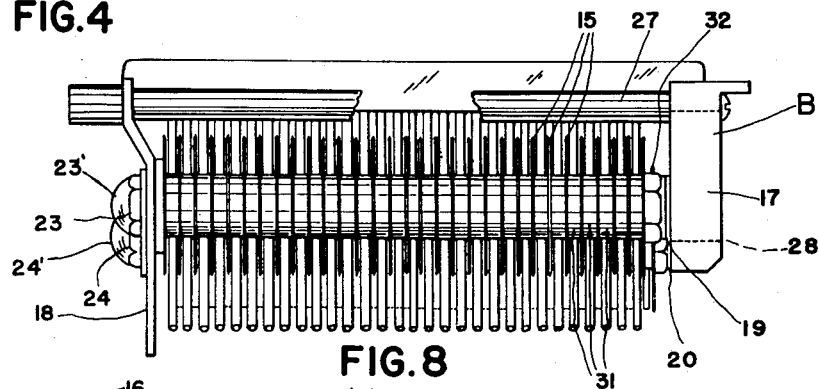
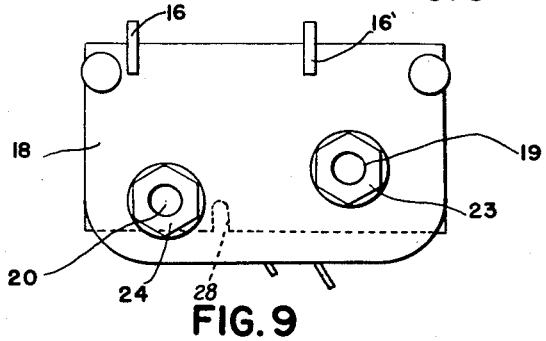

June 27, 1950           A. L. JACKSON           2,513,025
MEAT TENDERIZER
Filed June 8, 1945                              3 Sheets-Sheet 3
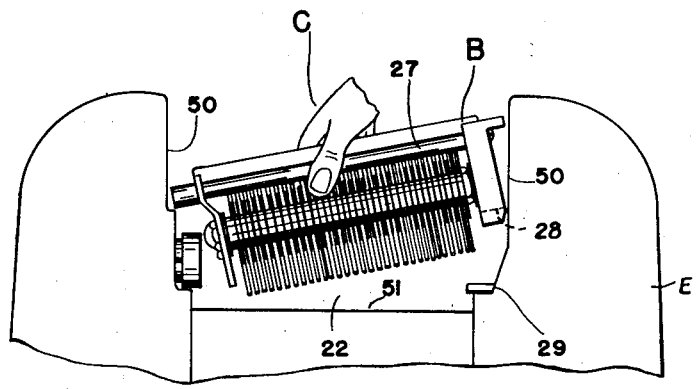
FIG. 10
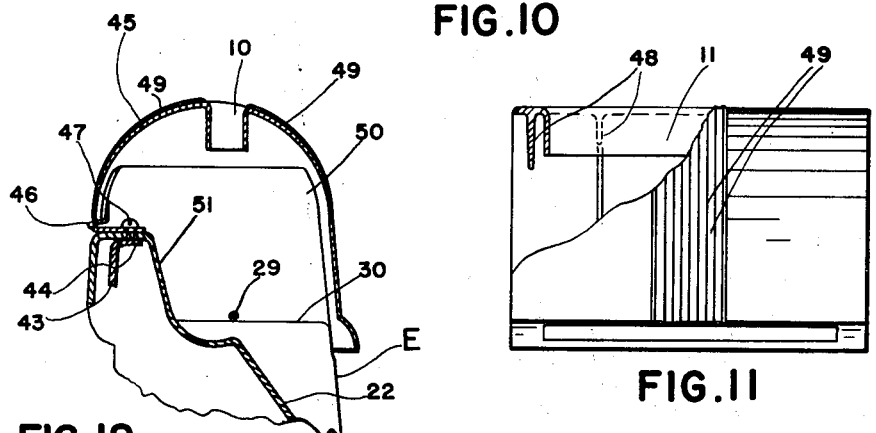
FIG. 11
FIG. 12
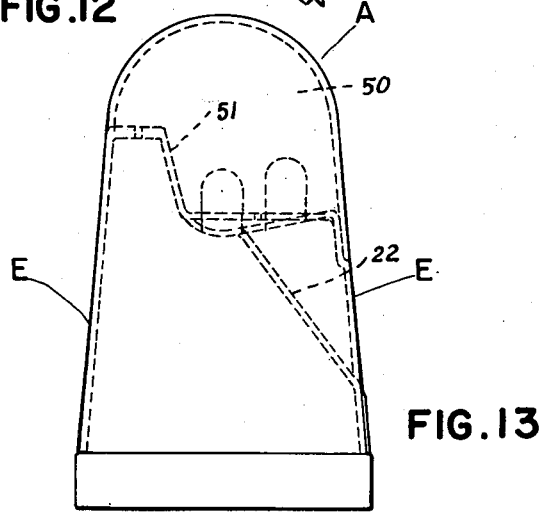
FIG. 13
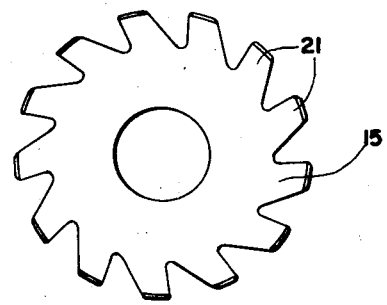
FIG. 14
INVENTOR.
ALDRICH L. JACKSON.
BY: *Howard Fischer*
ATTORNEY Patented June 27, 1950

2,513,025

UNITED STATES PATENT OFFICE 2,513,025

MEAT TENDERIZER

Aldrich L. Jackson, Minneapolis, Minn., assignor to Hobart-Federal Engineering Corporation, Minneapolis, Minn., a corporation of Minnesota Application June 8, 1945, Serial No. 598,333

23 Claims. (Cl. 17—26)

This invention relates to a meat tenderizer into which the meat is dropped at the top and in the operation of the tenderizer the meat is carried through the machine and processed to tenderize the same discharging the processed meat virtually directly below the point where it is to be processed. The operation is simple, quick and very effective.

Sanitation and cleanliness are paramount requirements of a machine of this character which is adapted to process fresh meat and therefore I have designed this machine to make it extremely easy for the operator to cleanse the working parts of the machine which processes the fresh meat thereby insuring sanitation in addition to the simple operation of the machine and providing a streamline casing for inclosing all of the working parts. Thus there is no reason why the operator can not keep the meat tenderizer immaculately clean.

A feature resides in providing the working unit consisting of a pair of processing rollers made up of a series of disc cutter knives between which the fresh meat is carried and processed. This working unit can be instantly lifted out of the machine. Thus when the butcher is about to close up his shop, can readily cleanse the cutter unit by lifting it out of the casing of the machine and holding it under a faucet where the unit can be thoroughly cleansed by flushing and by brushing to wash the unit free of any little particles of meat thereby leaving the unit fresh and clean and ready for use when desired. Furthermore, if the butcher does not desire to flush off or wash the cutter, he may lift the unit out of the casing and place it in his refrigerator where the same is kept fresh and clean.

It is a primary feature in my meat tenderizer, that the operator does not have to spend any time in disconnecting any of the working parts to remove the cutter head unit. It is only necessary for the operator to take hold of the sides of the unit and lift the same out of the machine and in the same manner the unit can be inserted into the machine. The cutter head unit is held together by a frame which includes end plate members for the processing rollers and side brace rods which may be easily engaged in handling the unit. Thus the operator does not need to come in contact with the sharp cutter knives. Therefore my new meat tenderizer completely eliminates the objectional extra work and time which was required heretofore in machines of this character where it was necessary virtually to take the machine apart so as to separate the processing rollers from the supporting frame as shown and disclosed in my Patent No. 2,364,533, dated December 5, 1944.

The easily removable processing unit which includes a pair of processing rollers is of primary importance because this unit constitutes the working parts which engage the fresh meat as it is processed through this unit in the operation of the machine. The unit includes a pair of stripping combs the fingers of which extend between the respective discs of the processing rollers and act as guide chutes for the meat being processed and at the same time keep the processing cutter knives clean of particles of meat. These stripper combs are part of the unit and while they may be removed separately from the unit itself they are carried with the unit in removing the same from the machine as set forth above. The side rods at the top of the unit are spaced apart and extend parallel to each other and act as brace members for holding the end plates of the unit spaced apart and these rods also form hand engaging means so that the operator can readily engage the unit to remove or insert it.

It is a feature to provide a casing for enclosing all of the working parts of my meat tenderizer which casing may be made of plastic material and of a streamlined character from end to end and from side to side. A plastic cover is hinged centrally between the ends of the casing and entirely encloses the operating unit. When the covering is raised, the processing unit is exposed and may be engaged as stated heretofore. This cover is formed with an integral chute or slot in the top of same having a portion extending toward the chute formed by the stripper finger combs. In the operation of the machine the cover is closed and all of the working parts are concealed therein. The meat to be processed is dropped through the slot in the cover and it falls directly into the chute formed by the combs and is engaged by the processing rollers which rotate toward each other in wringer-like fashion and draw the meat through the same with the meat being suspended by the blade-like teeth of the processing rollers and the meat as it is processed is carried out of the machine to an inclined surface on the front of the casing below the free edge of the cover.

The casing is adapted to enclose an electric motor, operating pulleys, belts and gears which are adapted to operate the processing rollers in the operation of the motor.

It is also a feature to provide a skeleton frame which may be made of metal or other suitable material which is positioned within the casing and which is adapted to support the electric motor. A countershaft extends above the motor and operates gears which drive a pair of jack shafts adapted to engage hexagonal nuts on the ends of the shafts which support the processing rollers and which are part of the unit. Sockets are formed in the jack shafts which conform with the inner ends of the roller shafts. These sockets are adapted to engage hexagonal nuts like a socket wrench so that when the jack shafts are rotating and the hexagonal nuts of the unit are engaged, the unit will be operated to rotate the respective processing rollers toward each other in wringer-like fashion. The unit rests in the well formed in the frame with the nuts on the end of the shafts engaging in the sockets and with a key lug holding the end of the unit opposite the sockets in alignment with the jack shafts. Therefore it will be apparent that the processing unit may be easily removed by simply lifting it out of the top of the skeleton frame.

It is a feature of sanitation to provide a plastic casing and enclosing all of the working parts and which may be easily cleansed and also protects the working parts as well as the operator.

These features together with other details and objects will be more fully hereinafter set forth.

In the drawings:

Figure 4 is a section on the line 4—4 of Figure 2.

Figure 5 is a detail section on the line 5—5 of Figure 2.

Figure 6 illustrates one of the jack shafts of the machine in side elevation.

Figure 7 is an end view looking into the socket formed in the end of the jack shaft.

Figure 8 is a front side view of the processing unit removed from the tenderizing machine.

Figure 9 is an end view of the unit shown in Figure 8 looking toward the hexagonal nuts in the jack shafts.

Figure 10 is a front detail of the tenderizer showing the operator's hand engaging the processing unit to illustrate the manner in which the same is inserted or removed from the supporting frame of the machine.

Figure 11 is a front view of the cover, a portion of which is broken away to illustrate the integral chute formed in the top of the cover.

Figure 12 is an end view of the cover illustrating a portion of the frame and the casing in section to show the manner in which the cover is hinged and secured to the frame and the casing.

Figure 13 is an outside end view of the plastic casing which encloses the working parts and showing in dotted outline the position of the respective walls formed in the casing as they would appear looking at the end of the machine.

Figure 14 illustrates a side view of one of the processing knives.

Figure 1:
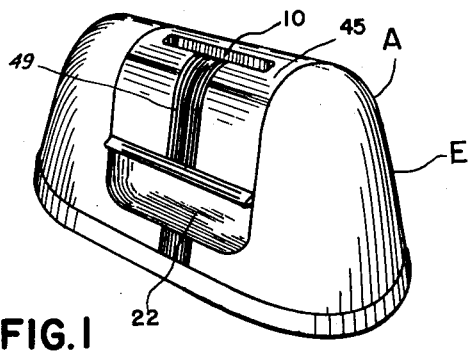
Figure 1 is a perspective view of my electric meat tenderizer as it appears with the plastic casing enclosing the working parts.
Figure 2:
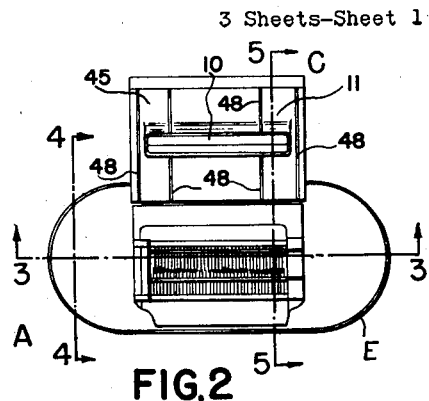
Figure 2 is a plan view of my meat tenderizer showing the cover in open position.

My meat tenderizer is illustrated in Figure 1 as it would normally appear in use with the cover closed and with the slot 10 shown in the top of the cover. Meat to be tenderized or processed to tenderize the meat is dropped into the slot 10 while the machine A is in operation.

As the meat passes through the slot 10 it is directed by the chute formed integral with the cover toward the processing unit B and into the chute opening 12 formed by the fingers of the stripping combs 13 and 14.

The stripper combs 13 and 14 are made up of a series of wire fingers which project between the disc cutter blades 15. Each of the combs 13 and 14 is of unitary construction and is formed with the longitudinally extending back portion 13' and 14' respectively. The ends of the back portion 13' and 14' rest in the slots 16 formed in the end plates of the unit B so that the respective combs 13 and 14 may be easily removed as units when desired.

The processing unit B which operates to tenderize the meat is composed with an end plate member 17 on one end and end plate 18 on the other end. The end plates 17 and 18 are adapted to support a pair of shafts 19 and 20. The shafts 19 and 20 carry a series of disc blades 15.

The cutter blades 15 are made with a series of teeth 21 each formed with a sharp razor-like arcuate edge and the term "cutter" as used herein is restricted to a member having a knife-like cutting action. The cutter discs of one of the shafts 19 are in staggered relation with the cutter blades 15 of the shaft 20 and the teeth 21 of the respective blades overlap. Thus when meat is introduced into the chute 12 the wringer-like processing rollers made up of the cutter blades 15 engage and support the meat without crushing the meat but cut into the body of the meat with a rotary cutting action as the meat passes between the teeth of the processing rollers of the unit B as the meat is being processed.

When the meat has passed through the rollers of the unit B it is discharged on the inclined surface 22 of the casing which provides an opening out of the casing centrally in the front thereof.

Figure 3:
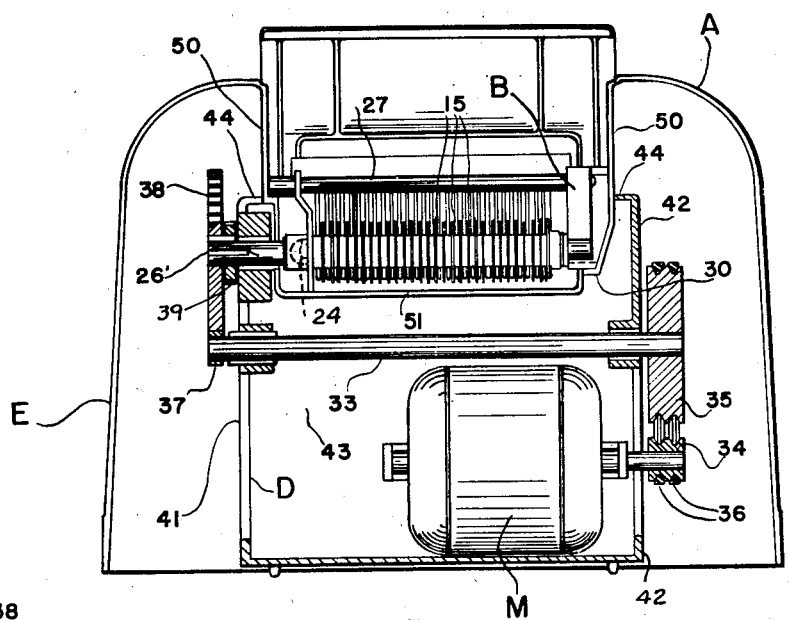
Figure 3 is a longitudinal section on the line 3—3 of Figure 2.
Figure 15:
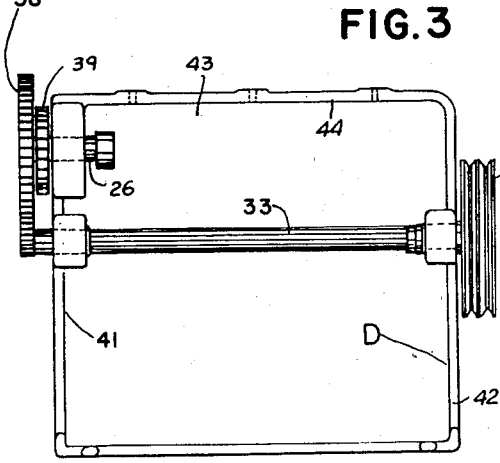
Figure 15 is a front view of the metallic skeleton frame for supporting the entire mechanism, including the motor, the tenderizer unit and the casing.

The unit B includes the respective shafts 19 and 20 which are journaled at one end in the plate 17 and at the other end in the plate 18 with the shafts free to be rotated in the operation of the machine. The ends of the shafts 19 and 20 which project beyond the plate 18 are provided with cap means or engageable ends such as hexagonal nuts 23 and 24 each having an arcuate crown portion 23' and 24' respectively. The hexagonal nuts 23 and 24 are adapted to fit into the hexagonal sockets 25 formed in the inner ends of the jack shafts 26 when the unit B is in operating position in the machine A as illustrated in Figure 3. The unit B is formed with longitudinally extending brace rods 27 on either side of and positioned at the top of the unit. The end plates 17 and 18 and the brace rods 27 form a frame structure supporting the shafts 19 and 20 of the processing rollers and the combs 13 and 14, and the brace rods 27 additionally provide means by which the operator's hand C may engage the unit B to insert the unit into the machine A or to remove it.

A slot 28 is formed in the bottom edge of the end plate 17 which engages with a pin 29 in the shelf 30 of the frame which supports the unit B in operation position. Thus the unit B is held centrally in the machine on the opposite end of the unit to the hexagonal nuts 23 and 24.

A primary feature of my invention resides in a meat tenderizer machine which is provided with the unitary tenderizer unit B which may readily be removed or inserted into the machine being a very simple operation and thus the unit may be cleansed or it may be replaced by a new unit and the old unit can be set aside until it can be repaired. In the unit B where the toothed cutting blades 15 are employed to cut slits into the body of the meat, it will be apparent the blades 15 may wear out or the teeth 21 in same may break off or become injured should a bony piece of meat be inserted into the machine B.

The shafts 19 and 20 which support the cutter discs 15 may be removed from the side plates 17 and 18 and then the disc cutters 15 may be removed and new cutters placed on the shafts. The disc cutters 15 are held spaced apart by washer spacers 31 and are locked on the respective shafts by the nuts 32. Thus the cutter discs 15 are held rigidly in place on the shafts and the teeth of the respective discs 15 are staggered in relation to each other which acts to cut staggered slits in the body of the meat when it is processing between the rollers.

The rollers formed by the discs 15 in the unit B are rotated toward each other by means of the electric motor M which is mounted on the skeleton frame D which is positioned in the plastic casing E. The skeleton frame D is preferably made of metal to provide a strong frame for supporting the motor M and the counter shaft 33. The shaft 33 is driven by the electric motor M through the drive pulley 34 secured on the motor shaft and the pulley 35 secured on one end of the counter shaft 33. The pulleys 34 and 35 are formed with V grooves for receiving the V-belts 36. In this manner I provide a tight driving means from the motor to the countershaft 33.

The shaft 33 carries the gear 37 on the opposite end to the pulley 35. The gear 37 meshes with the gear 38 which is mounted on the end of the jack shaft 26' which shaft is longer than the jack shaft 26. Then by the smaller gears 39 and 40 the shorter jack shaft 26 is driven in a manner to cause the shafts 19 and 20 to rotate toward each other and thus operate the processing rollers formed by the cutter discs 15 like a pair of wringer rollers which act to draw the meat between the rollers during the processing operation.

The skeleton frame D is positioned centrally between the ends of the plastic casing E as illustrated in Figure 3 and is formed with end walls 41 and 42 which project upward from the motor M to form a strong frame within the plastic casing E for supporting the counter shaft 33 and the jack shafts 26 and 26'. The skeleton frame is formed with a back wall 43 on which the motor M is mounted.

The plastic casing E is adapted to be attached to the skeleton frame D on the shelf portion 44 which extends horizontally along the top of the back wall 43 and between the skeleton end walls 41 and 42. The frame and casing thus provide a housing for the tenderizer.

The attachment of the casing E to the skeleton frame will be apparent from Figures 4 and 5. Figure 4 also shows the manner in which the end wall 41 projects in skeleton form away from the back wall 43 to provide supporting means for the counter shaft 33 and is then off set to support the jack shafts 26 and 26'.

The cover 45 is also formed of plastic and is provided with the slot 10 in the same for receiving the meat to be processed by the machine A. The cover is hingedly supported at 46. The hinge 46 is supported on the shelf 44 by the bolts 47 which also secure the casing E to the shelf 44. The cover 45 may be raised as illustrated in dotted outline in Figure 5 and turned back to full open position as illustrated in Figure 3. The cover 45 is formed with the integral chute 11 and reinforced ribs 48 which extend transversely on the inside of the cover. Integral ribs 49 are formed on the outer surface of the cover as illustrated in Figures 1 and 11. When the cover is in a closed position as illustrated in Figure 1 all of the working parts of the machine A are entirely enclosed.

The weight of the operating mechanism in the machine A is supported primarily by the skeleton frame D. The cover of casing E may extend virtually to the surface on which the machine is adapted to rest, but the plastic casing E does not need to support the weight of the mechanism within the machine A.

The plastic casing E is formed with inner depending end side walls 50, which are integral with the casing and which join with the back wall 51 which extends down in back of unit B curving below the rear operating rollers supported on the shaft 20 and joining integrally with the inclined surface 22 to form a discharge chute or opening out of the casing machine A.

Therefore, it will be apparent that the casing E which is preferably made of plastic is moulded with a central well formed by depending side walls 50, back wall 51 and the inclined wall 22 all of which portions are integral and form a well in which the processing unit rests as illustrated in Figures 3, 5 and 10. This central well portion formed in the casing E strengthens the same and provides surfaces within the well which can be easily cleansed when the unit B is lifted out of the same leaving the well open and freely accessible as illustrated in Figure 10.

Therefore, it will be apparent that I have designed my meat tenderizer to simplify the use of the same as well as providing a casing which can be made of plastic material so that it can be molded in any desired colors and which is strong, light in weight and which is adapted to receive the skeleton metal frame which is made durable and with sufficient strength to support the processing unit B. In this manner I have also provided a light weight skeleton frame for supporting the electric motor which operates the processing unit and which is concealed within the casing. In providing the skeleton frame for supporting the working parts of my meat tenderizer, I am able to reduce the weight of the meat tenderizing machines which I have made before and by streamlining the plastic casing the machine has an attractive appearance with smooth polished outer surfaces which may be readily cleansed and this is also true of the well in which the processing unit rests. Therefore, my meat tenderizer A may be kept immaculately clean inside and out at all times.

The replaceable processing unit B not only permits the operator to put a new processing unit into the machine within a few moments but it also provides the advantage of permitting the operator to remove the unit B at any time so that it can be thoroughly cleansed or placed in a refrigerator when not in use. A further advantage of my meat tenderizer resides in the easy manner in which the cutter blades 15 may be sharpened at any time which is accomplished by placing a V sharpening tool, held bearing lightly upon the edges of the teeth 21 while the same are being rotated by the electric motor.

There are no complicated parts in my meat tenderizer. The processing unit B is compact and easy to handle either by inserting or removing it from the well formed in the casing E.

I claim:

1. A meat tenderizing device adapted for use in a machine of the type having a frame, a motor, and means driven by the motor, said device adapted to be readily removed from and operatively connected with said frame and said driven means as a unit, said device comprising a frame structure having parallel spaced shafts, tenderizing means mounted on the shafts, said shafts being rotatably mounted in said frame structure, and means associated with the shafts constituting means for transmitting power to the rolls from said driven means, said associated means being so constructed relative to said driven means that a single lifting movement of said device when in position in said machine will effect a driving separation, and said frame structure including longitudinally extending means spaced from each other for bracing the frame structure, and adapted to be used as a hand hold by the operator for placing the tenderizing device in or removing the tenderizing device from the machine frame.

2. A meat tenderizing device adapted for use in a machine of the type having a frame, a motor, and means driven by the motor, said device adapted to be readily removed from and operatively connected with said frame and said driven means as a unit, said device comprising a frame structure having parallel spaced shafts, tenderizing means mounted on the shafts, said shafts being rotatably mounted in said frame structure, and means associated with the shafts constituting means for transmitting power to the rolls from said driven means, and said frame structure including longitudinally extending means spaced from each other at the upper portion thereof for bracing the frame structure, and adapted to be used as hand holds by the operator for placing the tenderizing device in or removing the tenderizing device from the machine frame.

3. A meat tenderizing device adapted for use in a machine of the type having a frame, a motor, and means driven by the motor, said device adapted to be readily removed from and operatively connected with said frame and said driven means as a unit, said device comprising a frame structure having parallel spaced shafts, tenderizing means mounted on the shafts, said shafts extending through the frame structure at one of the sides thereof, and cap means mounted on the extended ends of the shafts, said cap means constituting a means for transmitting power to the rolls from said driven means, and said frame structure including longitudinally extending means for bracing the frame structure, and adapted to be used as a hand hold by the operator for placing the tenderizing device in or removing the tenderizing device from the machine frame.

4. A meat tenderizing device adapted for use in a machine of the type having a frame, a motor, and means driven by the motor, said device adapted to be readily removed from and operatively connected with said frame and said driven means as a unit, said device comprising a frame structure having parallel spaced shafts, tenderizing means mounted on the shafts, said shafts extending through the frame structure at one of the sides thereof, and cap means mounted on the extended ends of the shafts, said cap means constituting a means for transmitting power to the rolls from said driven means, and said frame structure including spaced, longitudinally extending bars for bracing the frame structure and adapted to be used as hand holds by the operator for placing the tenderizing device in or removing the tenderizing device from the machine frame.

5. A meat tenderizing machine comprising an inner frame structure, an outer casing supported by the inner frame structure and having at its upper end a depending portion providing a recess and a portion providing an inclined surface, said recess adapted to receive therein a tenderizing roll of a plural roll unit, and said inclined portion being so located relative to the bite between the rolls as to receive thereon meat ejected by the rolls, said casing being provided with a swingable cover having an opening therein, said cover when in operative position having its opening in alignment with the receiving bite portions of the rolls, said plural roll unit having spaced combs thereon, the space between the combs being in alignment with the cover opening, a frame structure for said rolls, said rolls having bearing means in said last mentioned frame structure, drive means in said inner frame structure, means associated with said rolls constituting means for transmitting power from said drive means to the rolls, and a motor mounted on the inner frame for operating said drive means, said drive means and said third recited means being so related that a single lifting movement of the roll unit structure will effect driving separation and release of the roll unit from the machine.

6. A meat tenderizing machine comprising an inner frame structure, an outer casing supported by the inner frame structure and having at its upper end a depending portion providing a recess and a portion providing an inclined surface, said recess adapted to receive therein a tenderizing roll of a plural roll unit, and said inclined surface being so located relative to the bite between the rolls as to receive thereon meat ejected by the rolls, said casing being provided with a swingable cover having an opening therein, said cover when in operative position having its opening in alignment with the receiving bite portions of the rolls, said plural roll unit having spaced combs thereon, the space between the combs being in alignment with the casing opening, a frame structure for said rolls, said rolls each having a nut-like end and having bearing means in said last mentioned frame structure, jack shafts supported in said inner frame structure, said jack shafts having nut receiving sockets to receive the nut-like ends of said rolls, and means mounted on the inner frame for driving said jack shafts whereby a single lifting movement of the roll unit structure will effect driving separation and release of the roll unit from the machine.

7. A meat tenderizer including a skeleton frame, a casing surrounding said frame and adapted to be supported thereby, an electric motor mounted on said skeleton frame, a counter shaft operated by said motor through V-shape pulleys and belt means, a pair of jack shafts rotatably supported in said skeleton frame, a train of gears extending from said counter shaft to said jack shafts to rotate said jack shafts toward each other, nut receiving sockets formed in the inner ends of said jack shafts, said casing being provided with a central well comprising a downwardly and outwardly sloping wall and a meat tenderizing operating unit combining a pair of processing rollers each made up of a series of disc cutter knives, said unit including a frame structure for said rollers, said rollers having bearing means in said frame structure, means associated with said rollers constituting means for transmitting power from said jack shafts to said rollers, said unit having a pair of spaced apart stripping combs with fingers extending between cutting blades of said units, said combs forming a chute for receiving meat to be processed by said rollers, a receiving opening in the cover of said casing and a discharge opening below said processing rollers out of which the processed meat may fall.

8. A meat tenderizer including a strong skeleton inner frame, an electric motor mounted on said frame, drive means on said frame actuated by said motor, a casing for enclosing the working parts of said tenderizer and having a well formed in said casing with end, back and bottom walls integral with said casing, a cover for closing said well, the bottom wall of said well extending into an opening formed in the front of said casing and a replaceable tenderizing unit adapted to be removed or inserted by one hand of the operator as a unit, said unit including a pair of meat tenderizing rollers each made up of a series of cutting disks, said unit also including a frame structure for said rollers, said rollers having bearing means in said frame structure, means associated with said rollers constituting means for transmitting power from said drive means to said rollers, said drive means adapted to rotate said rollers toward each other with a wringer-like action to carry the meat through said unit to tenderize the same.

9. A meat tenderizer including an inner skeleton frame having a base portion for supporting upward extending ends, back, shelf and side portions, an electric motor mounted in said skeleton frame, a casing adapted to enclose said motor and skeleton frame, said casing being provided with a well comprising a downwardly and outwardly sloping wall, jack shafts supported in said frame operated by said motor and having socket nuts formed on the inner ends of the same, and a tenderizing unit adapted to rest in said well and replaceably positioned therein, said unit including a pair of processing rollers adapted to be operated by said jack shafts when the same are operated by said motor, said unit also including a frame structure for said rollers, said rollers having bearing means in said frame structure.

10. A meat tenderizing machine including a casing, said casing having at its upper end a depending portion providing a recess, a meat tenderizing unit adapted to rest in said recess and including a pair of processing rollers between which the meat to be tenderized is adapted to be drawn and a frame structure for said rollers, said rollers having bearing means in said frame structure, drive means for actuating said rollers, means associated with said rollers constituting drive means for transmitting power from said drive means to said rollers, and an electric motor concealed in the base of said casing for operating said drive means, said unit including said rollers and frame structure being removable in its entirety by lifting said unit out of said recess by hand to permit a similar unit to be placed in said recess by momentary action.

11. A meat tenderizer including, a casing, a well comprising walls formed integral with and depending from the top of said casing centrally thereof, a skeleton frame positioned within said casing and extending on either side of said well and adapted to support said casing and well, an electric motor supported by said skeleton frame and concealed within said casing, a pair of jack shafts projecting into said well, driving means connecting said electric motor with said pair of jack shafts, said jack shafts each having a nut socket on the inner end thereof, and a replaceable meat processing unit including a frame structure, said frame structure including end members and longitudinally extending means connecting said end members, a pair of meat slitting rollers comprising shafts having bearings in said end members, said shafts each having a nut end which is adapted to fit into a nut socket of one of said jack shafts and a centering lug on the end member of said unit opposite said jack shafts.

12. A meat tenderizing unit comprising, a pair of tenderizing rollers each made up of a series of cutters and a shaft, a pair of removable stripper combs having fingers extending between the cutters and spaced apart to form a chute leading into the top and through said rollers, end plates providing bearings for the ends of said shafts, an engageable end formed on each of the shafts of said rollers for receiving driving mechanism, brace means extending between and connected to said end plates, said unit providing the complete tenderizing apparatus and being removable as a whole from the driving mechanism by simply lifting the same out of contact with the driving mechanism.

13. A meat tenderizing unit comprising, a pair of tenderizing rollers each made up of a series of cutters and a shaft, a pair of spaced apart stripper combs having fingers extending between the cutters, end plates providing means for supporting the ends of said shafts, an engageable end formed on each of the shafts of said rollers for receiving driving mechanism, brace means extending between and connected to said end plates, said unit providing the complete tenderizing apparatus and being removable as a whole from the driving mechanism by simply lifting the same out of contact with the driving mechanism.

14. A meat tenderizing device adapted for use in a machine of the type having a housing, a motor, and means driven by the motor, said device adapted to be readily removed from and operatively connected with said housing and said driven means as a unit, said device comprising a frame structure having parallel spaced shafts, tenderizing means mounted on the shafts, said shafts being rotatably mounted in said frame structure, and means associated with the shafts constituting means for transmitting power to the shafts from said driven means, and said frame structure including longitudinally extending means spaced from each other for bracing the frame structure.

15. A device as set forth in claim 14 in which at least one of the power transmitting members is arcuately shaped at its connecting end to permit disengagement of the device by a tilting and lifting action.

16. A device as set forth in claim 14 in which abutting surfaces are provided on the housing and at the end of the frame structure opposite the driven end and which slope upwardly and away from the shafts to permit removal of the frame by a tilting and lifting action.

17. A device as set forth in claim 14 in which the tenderizing means are spaced cutter members and in which a pair of combs are mounted within the frame structure, said combs having stripper teeth extending between said members.

18. A device as set forth in claim 14 in which the shafts are held by the frame structure against substantial axial, lateral and vertical movement.

19. A device as set forth in claim 14 in which the driving connection is at one end of the frame structure and the other end of said structure and said housing are provided with a complementary abutment and recess adapted to center and fix the frame structure against lateral and axial movement within the housing.

20. A meat tenderizing device adapted for use in a machine having a housing, a motor, and driving mechanism comprising: a pair of parallel tenderizing rollers each made up of a shaft on which is mounted a series of knives having toothed cutting edges, a pair of spaced apart stripper members having a portion extending between each adjacent pair of cutting edges of each series of knives, plate-like end members providing means for supporting the ends of said shafts in operative position and with the axes of said shafts being in planes spaced vertically from each other providing for the downward passage of meat therebetween, an engageable end on each of the shafts, at least one of said engageable ends being operatively engageable with said driving mechanism and readily detachable therefrom, and brace means between said plate-like end members, said device providing a complete tenderizing apparatus and being removable as a unit from the machine to facilitate cleaning and the like by simply lifting the same out of contact with the driving mechanism and being directly replaceable as a unit in driving engagement therewith.

21. A meat tenderizing device adapted for use in a machine having a housing, a motor, and means driven by the motor, said device being adapted to be readily removed from and operatively connected with said housing and said driven means as an assembled unit, said device comprising: a frame structure having parallel spaced shafts, tenderizing means mounted on the shafts, the shafts being rotatably mounted in said frame structure and having their axes in laterally spaced relation providing for generally downward passage of meat therebetween, means cooperating with a part of said machine for removably securing said device in operative position on said housing, and means associated with the shafts for transmitting power to the shafts from said driven means, and said frame structure including longitudinally extending means for bracing said structure.

22. A meat tenderizing device adapted for use in a machine having a housing, a motor within the housing and a keyed driving member operatively connected to the motor comprising: a pair of parallel cutter rollers so positioned that meat may be fed therethrough from above and each including a shaft having a series of axially spaced knives thereon provided with toothed cutting edges, the knives on one roller being in staggered spaced relation to the knives on the other roller, the distance between the axes of the shafts being substantially less than the combined radii of the knives, a pair of spaced apart stripper members having a portion extending between each adjacent pair of each series of knives, a lifter frame assembly for the rollers including plate-like end members connected by at least one brace member adapted for a handle, mutually engaging means on the rollers and end members to hold the rollers in axial alignment in the frame assembly, said rollers having engageable ends and at least one roller having a keyed driving connection at one end adapted to operatively engage said keyed driving member and being readily releasable therefrom, said lifter frame assembly being removable as a unit from the machine, and a cover for said lifter frame assembly having an opening in the upper portion thereof for feeding meat to the rollers.

23. In a meat tenderizing machine having a housing, a motor therein and means for attaching a tenderizing unit thereto, a tenderizing unit comprising: a pair of spaced parallel rollers each having a shaft on which is mounted a series of disks provided with toothed peripheral cutting edges, the disks on one roller being in staggered spaced relation to the disks on the other roller and the distance between the axes of the shafts being substantially less than the combined radii of the disks, a pair of spaced apart stripper members having a portion extending between each adjacent pair of each series of disks, the rollers being so positioned with respect to each other that a piece of meat may be fed thereto from above, a lifter frame having plate-like end members and brace means therebetween, engageable ends on said rollers, at least one end of one roller providing a separable driving connection with said motor and means on the unit cooperating with said attaching means for maintaining the unit on the housing and providing for ready removal therefrom.

ALDRICH L. JACKSON.

REFERENCES CITED

The following references are of record in the file of this patent:

UNITED STATES PATENTS

| Number | Name | Date |
| --- | --- | --- |
| D. 142,508 | Ahrndt | Oct. 9, 1945 |
| 1,635,053 | Meyers | July 5, 1927 |
| 1,973,284 | Huse | Sept. 11, 1934 |
| 1,979,464 | Gurney | Nov. 6, 1934 |
| 1,982,487 | Swift | Nov. 27, 1934 |
| 2,291,809 | Jackson | Aug. 4, 1942 |
| 2,346,686 | Jackson | Aug. 18, 1944 |
| 2,364,533 | Jackson | Dec. 5, 1944 |
| 2,409,463 | Ahrndt | Oct. 15, 1946 |